United States Patent Office 3,419,935
Patented Jan. 7, 1969

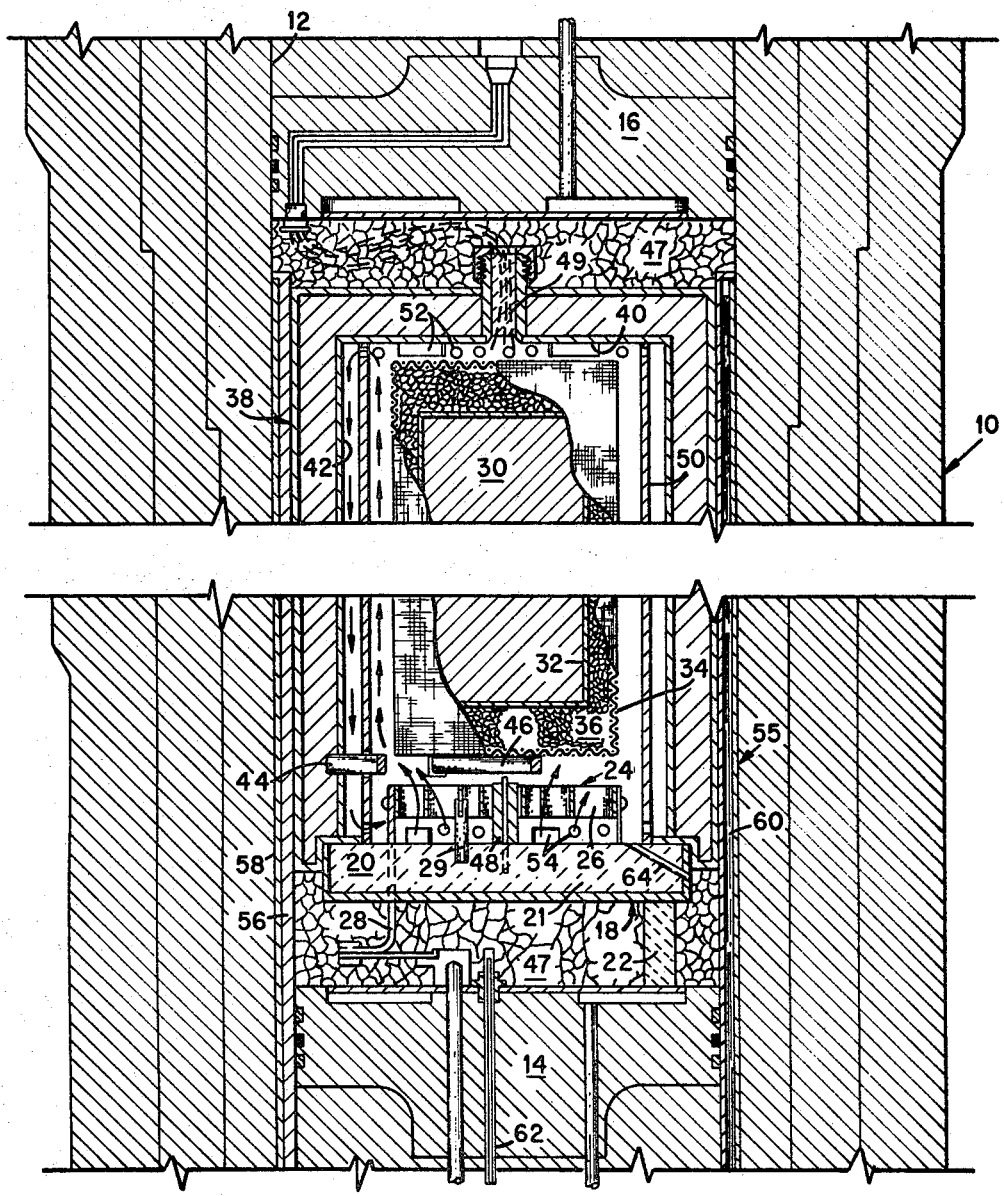

3,419,935
HOT-ISOSTATIC-PRESSING APPARATUS
William A. Pfeiler, Norris, and Charles K. Valentine, Oak Ridge, Tenn., assignors to the United States of America as represented by the United States Atomic Energy Commission
Filed Dec. 19, 1966, Ser. No. 603,066
U.S. Cl. 18—5    9 Claims
Int. Cl. B29c 3/00; B22f 3/14

ABSTRACT OF THE DISCLOSURE

Products exhibiting uniform densification are prepared in a hot-isostatic-pressing apparatus using a gas as the heat and stress transmitting medium. Uniform temperature distribution throughout the thermal-pressure zone is achieved by employing a natural thermal convection heating system operating in a closed loop. An inert gas heated in the lower end of the thermal-pressure zone rises by natural convection forces along a first flow path to uniformly heat the product material and thereafter contacts a "cold wall" for effecting downward flow of the gas along a separate flow path for subsequent reheating and recycling.

---

The present invention relates generally to the formation of products by hot-isostatic pressing, and more particularly to a method and apparatus for hot-isostatically pressing materials by using a fluid as the heat and stress transmitting medium with this fluid being continually recycled by natural convection forces throughout the thermal-pressure zone containing product material to effect uniform heating and densification of the material. This invention was made in the course of, or under, a contract with the U.S. Atomic Energy Commission.

The formation of products by practicing hot-isostatic-pressing techniques is presently enjoying considerable interest since the resulting products possess near theoretical density together with uniform and desirable engineering and metallurgical properties. The fabrication of products by hot-isostatic pressing is normally achieved by confining pre-shaped or formed materials, such as, for example, particulate or solid metals, alloys, ceramics, graphites, carbides, mixtures and/or layers of these materials, etc., in a pressure vessel and thereafter subjecting the materials to high, uniformly applied stresses and elevated temperatures to effect densification and, in certain applications, bonding of the confined materials. Perhaps one of the more promising hot-isostatic procedures upon considering the various standpoints of economics, efficiency, and product characteristics is the utilization of a gas as the pressure transmitting medium. The gas is preferably inert to prevent interactions with the material being processed, i.e., the workpiece, and with pressure vessel components especially at higher temperatures. The operating conditions in a hot-isostatic-pressing apparatus using inert gas may include a pressure range varying from about a few atmospheres to 3000 or more atmospheres and an operating temperature in a range varying from about ambient to about 2000° C. Hot-isostatic-pressing apparatus of this nature have been often referred to as "gas autoclaves" since this terminology has been accepted, at least in the related art, as being descriptive of hot-pressing apparatus wherein an inert gas is employed as the stressing medium for high pressure and high temperature processing. Accordingly, the term "autoclave" as used in this description is intended to be directed to such high pressure and temperature apparatus.

While the gas autoclaves as previously known exhibited some promising results, they also suffered several shortcomings or drawbacks which detracted from their over-all desirability. For example, the utilization of these previous autoclaves in applications wherein relatively large workpieces (over about two feet in length) are processed has been somewhat limited due to the deficiencies of the heating systems employed to heat the workpieces. Considerable investigations have been conducted in an effort to come up with a heating system capable of providing and maintaining essentially uniform temperatures throughout the entire workpiece at the maximum processing temperature, together with minimal temperatrue differentials during the heat-up period. The utilization of such uniform heating is considered necessary in order to obtain products exhibiting essentially uniform densification and bonding throughout. Perhaps one of the better techniques of heating the workpiece as previously practiced consisted of surrounding the working volume or zone of the autoclave with heating elements for heating the workpiece primarily by conduction through particulate or solid packing materials housing the workpiece. However, with this and other previously known heating systems substantial temperature differentials occurred along relatively long workpieces during the heat-up and hold periods. For example, in a typical workpiece processing operation conducted in a relatively large autoclave and requiring a processing temperature of 1000° C., a temperature gradient or differential of 200° C. or more occurs in the working zone during heat-up and hold periods. A temperature differential in the working zone of this magnitude is highly undesirable since products processed under such conditions exhibit non-uniform densification and bonding so as to render such products unsuitable for their intended purposes. The mechanism believed primarily responsible for these large temperature differentials is the production of thermal convection currents in the gas employed as the pressure transmitting medium. These convection currents are due to a "buoyancy effect" of the hot gases whereby the hotter gases tend to flow upwardly and while doing so continually displace cooler gases so as to create considerable turbulence in the working zone while simultaneously subjecting the uppermost portion of the workpiece to the hotter gases due to the "pooling" of these gases. The greater the pressure within the working zone, the greater the turbulence. Further, the length of the workpiece, i.e., its vertical dimension, in the work zone is limited to less than about two feet since the drawbacks due to gas convection currents are substantially increased as the length of the work zone increases. Efforts to minimize or overcome the problems due to the presence of such convection currents have met with only partial success. For example, these efforts include the use of helium as the pressure transmitting medium since this particular gas does not lend itself to the production of turbulence due to convection currents in the same manner as argon or perhaps other inert gases. Compensation of the temperature differentials in the workpiece due to convection currents was also previously attempted by using complex control systems for programming the heat to the color areas of the workpiece to provide a more uniform heating thereof. While this heat programming technique met with some success, it also became progressively less effective as the length and diameter of the working zone increased and did not sufficiently compensate for the deleteriously high temperatures which occurred in the upper portion of the working zone due to the presence of uncontrolled gas convection currents.

It is the aim of the present invention to obviate or substantially minimize the above and other shortcomings or drawbacks suffered by the previously known gas autoclaves by providing a unique gas heating system for use in gas autoclaves whereby uniform heating of the workpiece is readily accomplished by utilizing the heretofore deleterious hot-gas convection currents. Generally, the gases are heated in the lower section of the working zone of the pressure vessel and are caused to flow upwardly under the influence of natural convection forces through an annular channel defined by the workpiece and its containment structure and an annular liner disposed thereabout. As these gases rise the heat contained therein is transferred to the workpiece container primarily by convection. These gases upon reaching the top or uppermost portion of the closed upper end of the working zone are caused to flow outwardly and then downwardly through a further channel defined by the liner and wall portions of the pressure vessel encircling the liner. This downward flow of gases is due to the cooling effect the vessel wall has upon the gases within this further or outermost channel. In other words, as the gases enter this further channel the vessel wall functions as a heat sink to draw heat from the gases and thereby increase the density of the gases for causing them to flow in a downwardly oriented direction. These wall portions may be even further cooled by heat exchange means to enhance the gas flow through this channel formed by the pressure vessel wall portion and the liner. The downflowing cooler gases are returned to the gas heating mechanism, heated, and thereafter recycled. Thus, there is provided an arrangement wherein the gases are continuously recycled to establish an internal, relatively turbulence-free, natural-convection, closed-loop, gas heating system for uniformly heating the entire workpiece. This uniform heating of the workpiece may be accomplished with workpieces of lengths greater than twice the maximum length of the workpieces processed in many previous gas autoclaves.

An object of the present invention is to provide for the processing of material by hot-isostatic pressing in a new and improved manner.

Another object of the present invention is to provide a new and improved hot-isostatic-pressing apparatus which uses a gas as the heat and stress transmitting medium.

A further object of the present invention is to provide a hot-isostatic-pressing apparatus wherein a heat and pressure transmitting fluid is subjected to natural convection forces to effect essentially uniform heating of confined workpieces.

A still further object of the present invention is to provide a new and improved hot-isostatically-pressed product which exhibits virtually uniform density and bonding throughout regardless of the product dimensions.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description. The preferred embodiment illustrated is not intended to be exhaustive or to limit the invention to the precise form disclosed. It is chosen and described in order to best explain the principles of the invention and their application in practical use to thereby enable others skilled in the art to best utilize the invention in various embodiments and modifications as are best adapted to the particular use contemplated.

In the accompanying drawing:

The figure is a somewhat schematic sectional view of a preferred form of a gas autoclave or hot-isostatic-pressing apparatus incorporating the unique, natural-convection heating system of the present invention.

With reference to the drawing, the hot-isostatic-pressing apparatus or gas autoclave of the present invention is shown comprising a high pressure containment structure or pressure vessel 10 of a generally tubular configuration so as to define a centrally oriented throughgoing cavity 12. This cavity is shown provided with vertically-spaced-apart water-cooled mushrooms or seal assemblies 14 and 16 which, together with wall portions of the vessel 10 delineating the cavity 12, form a closed chamber within the vessel where materials such as those mentioned above may be hot-isostatically pressed. The seal assemblies 14 and 16 are provided with suitable locking mechanisms such as interrupted thread-type joints (not shown) and seals, so as to be readily removable from the cavity and yet be able to withstand designed pressure loadings when secured in place.

Within the lower end or portion of the closed chamber of the pressure vessel there is shown a heating mechanism or assembly 18 which may comprise a hearth 20 formed of an open-topped metal receptacle filled with refractory material 21 such as conventional fire bricks and supported or carried by the lower end seal assembly 14 in a spaced relationship thereto by a number of firebricks or the like such as shown at 22. The hearth 20 is used to support a heating element 24 for heating the pressure and temperature transmitting gas. This heating element may be of any desired and suitable construction but should be sufficiently perforate or porous so as to allow for the relatively uninhibited flow of gases therethrough. Satisfactory results have been achieved by using an electrical heating element formed of a plurality of helically wound resistance heating strips 26 of a refractory metal such as tungsten or molybdenum. These heating strips are loosely wound so as to provide ample space between adjacent strips 26 for permitting the desired quantity of gas flow through the heating element. The strips 26 are also wound in such a manner that the inner ends of the strips are joined together in the form of a toroid adjacent to the center of the heating element while the outer ends are free for attachment to a suitable external power supply (not shown) through electrical leads 28. The heating strips 26 are maintained in a spaced relationship to the upper surface of the hearth 20 by any suitable supporting structures such as slotted-strip receiving rods 29 for permitting the gas to enter the heating mechanism from below the heating element 24 for purposes to be described in detail below.

At a location in the closed pressure vessel chamber above the heating mechanism there is disposed the material or workpiece to be processed as generally shown at 30. This workpiece may be of an elongated configuration and is preferably sealed in a relatively thin impervious can or bag 32 of a suitable material such as stainless steel or the like and then placed in a metal basket or container 34 of substantially greater volume than that of the can 32 and provided with a sufficient quantity of perforations or openings through the side walls and ends thereof to allow for the flow of gases therethrough. The empty space or volume between the can 32 and the container 34 is preferably filled with a suitable granular, unreactive packing material 36 such as alumina, magnesium oxide, etc., so as to position and maintain the workpiece in the desired location within the container 34. The use of the granular material also provides a porous, relatively unyielding support structure through which hot gases may readily pass for heating and isostatically stressing the workpiece as will be discussed in greater detail below.

In order to position the workpiece 30 in the closed chamber of the pressure vessel in a desired location above the heating mechanism 18 and also partially define a working zone or thermal-pressure zone within which the workpiece is processed, the container 34 is carried within an inverted, cup-like assembly or bell 38. This bell is preferably of such dimensions that the volume within the bell as defined by the inside end wall 40 and inner side walls 42 or by its inner diameter and inner vertical length or heighth is sufficient to house the container and its contents in spaced relation to the inside walls of the bell. The inner diameter of the bell is also sufficiently great so as to have an end portion thereof adjacent the open end of the bell disposed about and laterally spaced from the heating element 24. Thus, as shown, the bell houses both the container 34 and the heating element 24 and rests upon the upper surface of the hearth 20 so as to limit the effective working zone to essentially the confines of the bell. The container 34 may be supported in a desired location inside the bell in any suitable manner such as by a suitable grate-like arrangement which may comprise a pair of spaced-apart removable rods 44 and 46 projecting across the inner diameter of the bell with the end portions thereof engaging suitable receptacles in the bell walls 42. These rods are preferably of a heat resistant material such as stainless steel or the like so as to assure adequate support of the workpiece during the pressing operation. However, in the event the rods weaken or fail during a material processing operation, a cylinder 48 of graphite or other suitable material disposed in the opening through the center of the heating element 24 formed by the wound heating strips 26 and resting upon the hearth 20 will provide adequate support for the workpiece.

With the bell 38 and its contents positioned in the pressure vessel 10 the lower and upper seal assemblies 14 and 16 are shown disposed in locations spaced from the hearth and upper surface of the bell, respectively, so as to provide an arrangement whereby excessive heating of the seal assemblies during a pressing operation is substantially minimized. The cavities defined by this spatial arrangement may be filled with a suitable insulating material 47 such as granules of fused alumina or the like to further minimize the transfer of heat from the working zone to the seal assemblies. Also, as shown, the bell 38 may be provided with a "leadthrough" 49 for permitting the placement of thermocouples and other sensing mechanisms in the working zone.

As briefly mentioned above, the workpiece heating system envisioned by the present invention operates on a convection heating principle whereby the gases, upon heating, flow upwardly as a smooth, i.e., relatively non-turbulent, stream along a first flow path to heat the workpiece and thereafter downwardly to the heating assembly along a separate and distinct flow path so as to avoid the deleterious temperature differentials as well as the turbulent mixing of the hot gases with the cooler gases. In order to provide such separate flow paths for the heat transmitting gas, the working zone is shown provided with a tubular elongated wall or liner 50. This liner 50 encompasses the workpiece container 34 and is disposed in spatial relationship to and intermediate the bell side wall 42 and the workpiece container 34 for defining therewith vertically oriented annular channels or passageways on opposite sides of the liner 50. As shown, the liner 50 is carried by and secured to the bell 38 and is provided with suitable throughgoing openings or apertures 52 and 54 adjacent the upper and lower ends of the liner 50, respectively, for placing the passageways or gas flow paths in registry with one another. If desired, this registration of the flow paths may also be achieved by terminating the liner 50 short of the bell end wall 40 and the upper surface of the hearth 20 and securing the liner to the bell or workpiece container 34 by suitable supporting structure. In any event it is at least highly desirable, if not necessary, to use a liner of sufficient vertical length so that when in place in the working zone it projects beyond or overlaps the end surfaces of the workpiece container 34 as shown or at least the workpiece 30 to assure that the hotter gases do not escape from the innermost passageway prior to uniformly heating the entire length of the workpiece 30 and to also assure that the cooler gases from the outermost passageway are again heated prior to contacting the workpiece. Further, with the openings 52 and 54 between these passageways being located near the upper and lower ends of the liner 50, the probability of forming hot-gas pockets and areas within which turbulence due to the mixing of gases at different temperatures is substantially minimized. Also, with the openings between the passageways at the lower end of the liner or working zone being located in a plane below the heating element 24, it is assured that the cooler gases are drawn into and through the heating element 24 before they have the opportunity of contacting the hotter gases emanating from the heating element 24.

In order to provide for the continuous, recycling flow of the workpiece heating gas through the passageways on opposite sides of the liner 50, the bell side wall 42 has a "cold-wall" effect upon the gas within the passageway nearest the side wall 42. Thus, as the gas enters this passageway, the side wall 42 functions as a heat sink to draw heat from the gas for increasing the density of the latter as it cools and thereby causing this "cooled" gas to flow in a downward direction. The cooling of the gas entering the outermost passageway in a relatively more rapid manner to enhance or further promote this downwardly directed flow of gases may be accomplished by cooling the bell side wall 42 with external means. The augmented cooling of the bell side wall 42 may be accomplished in any suitable manner such as by positioning a suitable heat sink in the form of a gaseous or liquid type heat exchanger or the like about and in close proximity to the bell side wall 42. Satisfactory results have been obtained by encircling the bell 38 with a heat exchanger 55 utilizing a liquid such as water for the coolant. This heat exchanger is shown comprising a pair of annular elongated plates 56 and 58 joined together and secured to the pressure vessel so as to be disposed between the pressure vessel walls and in close proximity with the outer side walls of the bell 38. The innermost plate 56 is preferably the thicker of the two and may be provided with a plurality of vertically extending and radially-spaced-apart interconnected grooves such as shown at 60 so as to define a plurality of enclosed coolant channels with the outer plate 58. This construction of the heat exchanger has proven desirable since it provides sufficient resistance to deformation by the high pressure loadings encountered in the pressure vessel and also provides adequate cooling of the bell side wall 42 to establish the desired cold wall effect. The use of such a heat exchanger is also desirable in many pressure vessel constructions since it prevents or minimizes the possibility of overheating the pressure vessel structure.

The gas used as the heat and stress transmitting medium is preferably an inert gas such as helium or argon, with the latter being the preferred gas since it is more economical and is a better thermal insulator. However, the invention is not to be limited to the use of inert gases such as argon and helium in that any substance which is non-reactive with the materials and structures used in the apparatus and which functions as a gas at the designed pressures and temperatures may also be used. Further, if desired, even reactive gases such as nitrogen and hydrogen may be used alone or in combination with the inert, gases to provide certain atmospheres in the working zone, e.g., a reducing atmosphere with hydrogen. The gas may be introduced into the working zone via a conduit 62 and a plurality of passageways through the hearth such as shown at 64. The gas is preferably introduced into the working zone and maintained at the pressure chosen to accomplish the pressing of the workpiece. However, if desired, the gas may be introduced into the working zone at a pressure less than the desired working pressure and then the heating system may be utilized to effect additional pressurizing of the gas. The gas within the working zone should be at a sufficient pressure and temperature to plastically deform the workpiece and promote solid-state diffusion bonding, and/or to sufficiently heat and deform the powders so as to produce sintering and densification to essentially theoretical densities. Further, the pressure of the gas in the working zone should be at least about 500 p.s.i. since the production of convection currents in zones at lower gas pressures is not sufficient to carry the necessary heat from the heating element 24. In addition to the specific bonding temperatures and pressure requirements for the various product materials, which may range from temperatures near room temperature to 2000° C. or more and pressures to 3000 atmospheres or higher, some of the various materials also require holding periods for extended durations at the processing temperatures and pressures to assure the attainment of time-related physical changes in the product, such as bonding, material deformation, densification, etc.

In order to better understand the present invention, a typical hot-isostatic-pressing operation is hereinafter set forth. The workpiece for the purpose of this illustration is beryllium powder to be processed at a temperature of approximately 800° C., at a pressure of 15,000 p.s.i., and subjected to a holding period of about one to two hours.

With the hot-pressing apparatus assembled as shown, argon is introduced into the working zone through conduit 62 to charge the zone with gas at approximately the desired processing pressure of 15,000 p.s.i. This gas is then heated by the heating element 24 to the desired processing temperature of about 800° C. The heated gas rises by natural heat convection in the form of a smooth stream to the upper portion of the working zone through the channel partially formed by the workpiece container 34 and the liner 50. This heated gas also flows through the interstices in the mass of the granular material 36 in the container to simultaneously densify and heat the workpiece to the desired processing temperature. Upon reaching the upper portion of the working zone, i.e., the portion of the zone above the workpiece and preferably above the workpiece container 34, the gas flows through the perforations 52 in the liner 50 and contacts the cold wall 42 where the gas is cooled so as to effect its return to the bottom of the working zone via the channel formed by the liner 50 and the cold wall 42. This cooler gas then flows through the liner perforations 54 into the heating mechanism 18 below the heating element 24 and thence through the latter to become reheated and recycled through the channels in a continuous manner.

The heating and stressing of the workpiece is maintained for the desired holding period of about one to two hours to assure that the powders forming the workpiece are bonded and the workpiece sufficiently densified to form the desired product. After the processing is completed, the bell 38 is removed from the pressure vessel to enable the product to be removed from the container 34 and can 32.

Products prepared in the gas autoclave of the present invention exhibit virtually uniform density throughout their entire lengths regardless of whether the product length is less than one foot or up to about four feet. This unique product densification is due to the employment of the novel heating system which provides uniform temperature distribution throughout the entire effective length of the working zone within the liner so as to assure uniform heating of the workpiece. This uniform heating is substantiated by the fact that with workpieces of approximately four feet in length and processed at temperatures of about 1000° C., the temperature differential in the workpiece from one end to the other is about 25° C. during heat-up and holding conditions.

While the novel autoclave heating system has been described in connection with the "top-loading" pressure vessel shown in the drawing, it will be appreciated that the heating system can be readily used in any suitable pressure vessel configuration, such as, for example, a "bottom-loading" pressure vessel or in a pressure vessel wherein the channel forming liner and cold wall are permanent structures in the pressure vessel.

It will be seen that the present invention sets forth a unique gas autoclave wherein the gas provides both the heat and stress transmitting medium for hot-isostatically pressing products. The thermal convection currents provided by the heating mechanism provide virtually uniform temperature distribution throughout the workpiece when employed as above described, whereas the thermal convection currents in previously known pressure vessels were primarily responsible for the non-uniform heating and poor densification of the workpiece. The effective length of the working zone in autoclaves employing the present heating system can be significantly greater than previously known since in these previous assemblies the existence of convection currents became increasingly deleterious as the length of the working zone increased. Further, the useful volume in the working zone may also be substantially greater due to the positioning of the heating mechanism in the bottom of the working zone rather than surrounding the workpiece with heating elements and insulation as previously practiced.

As various changes may be made in the form, construction, and arrangement of the parts herein without departing from the spirit and scope of the invention and without sacrificing any of its advantages, it is to be understood that all matter herein is to be interpreted as illustrative and not in a limiting sense.

What we claim is:

1. An apparatus for hot-isostatically pressing materials by using a fluid as the material heating and stressing medium, comprising a housing having inner wall portions defining side walls of a cavity, a vertically oriented tubulation disposed within said cavity at a location laterally inwardly spaced from said wall portions for defining an annular passageway therebetween and a material processing zone within said tubulation, passageway means adjacent opposite ends of said tubulation for placing the zone in registry with said passageway, and heating means disposed in said zone for heating a fluid to produce thermal convection currents therein and thereby effect fluid flow in a recirculatory and successive manner through said zone and said passageway.

2. Apparatus as claimed in claim 1, wherein means are disposed adjacent to said wall portions for cooling the latter and the fluid in said passageway to promote the flow thereof.

3. Apparatus as claimed in claim 1, wherein said heating means are disposed in said zone at a location intermediate said passageway means, and wherein said heating means include a conduit therethrough for providing a flow path for fluid emanating from the passageway and for facilitating the heating of the fluid prior to the admittance thereof into a major portion of said zone.

4. Apparatus as claimed in claim 3, wherein receptacle means for housing a material to be processed is disposed in the major portion of said zone at a location overlying and spaced from said heating means and laterally inwardly spaced from said tubulation for partially defining therewith a vertically extending annular channel within said zone, and wherein the tubulation overlaps the receptacle means when the latter is disposed therein for assuring that the passageway means are in planes overlying and underlying the material when the latter is housed in the receptacle means.

5. Apparatus as claimed in claim 4, wherein said receptacle means comprises a perforate elongated receptacle, the receptacle is adapted to contain perforate means for maintaining the material to be processed in a spaced relationship to the walls of the receptacle and wherein the perforate receptacle and the perforate means facilitate the transmission of heat from the fluid to the material.

6. An apparatus as claimed in claim 5, wherein the perforate means in said receptacle consists of discrete particulate bodies, and wherein the particulate bodies are disposed in said receptacle so as to envelope and support the material while simultaneously providing a plurality of flow paths for fluid emanating from the heating means.

7. An apparatus for hot-isostatically pressing materials of the character described by using a gas as the heat and stress transmitting medium, comprising a pressure vessel incorporating containment structure having wall portions defining an end wall and side walls of a chamber, a vertically oriented tubulation disposed in said chamber at a location laterally inwardly spaced from said side walls for defining therewith an annular vertically extending channel and for defining with said end wall a material processing zone within the tubulation, a passageway adjacent one end of the tubulation and said end wall for providing a flow path between said channel and said zone, perforate heating means disposed in said zone at a location remote to and underlying said end wall, support means for maintaining the heating means in a plane in said zone overlying the lowermost end of said tubulation, and a further passageway adjacent said lowermost end of the tubulation for placing said passageway in registry with a portion of said zone underlying said heating means, said heating means being adapted to heat a gas for producing terminal convection currents therein for effecting flow of hot gases through said zone towards said end wall for heating a material within said zone prior to entering said channel through the first-mentioned passageway and returning to said heating means through said further channel and said further passageway.

8. An apparatus as claimed in claim 7, wherein a perforate receptacle for housing a material to be processed is disposed in said zone in a spatial relationship to said end wall, heating means, and said tubulation, and wherein said receptacle houses a plurality of granules for enveloping a said material to assure essentially uniform heating and stressing of a said material by the flowing gas.

9. An apparatus as claimed in claim 8, wherein heat exchange means is incorporated in said pressure wheel in close proximity to said side walls for cooling the latter to effect cooling of the gas in said channel and thereby promote flow thereof towards said further passageway.

References Cited

UNITED STATES PATENTS

| | | |
|---|---|---|
| 2,745,713 | 5/1956 | Suits. |
| 2,990,602 | 7/1961 | Brandmayr et al. |
| 3,177,553 | 4/1965 | Archibald. |
| 3,230,286 | 1/1966 | Bobrowsky. |
| 3,249,964 | 5/1966 | Shaler. |
| 3,313,871 | 4/1967 | Vogel et al. |
| 3,328,838 | 7/1967 | Zeitlin. |
| 3,379,043 | 4/1968 | Fuchs. |

FOREIGN PATENTS 906,824    8/1963    France.

J. HOWARD FLINT, JR., *Primary Examiner.*

U.S. Cl. X.R.

75—226